Jan. 17, 1939.  R. L. COPSON  2,143,865
TREATING PHOSPHATE ROCK TO ELIMINATE FLUORINE
Filed Nov. 30, 1936
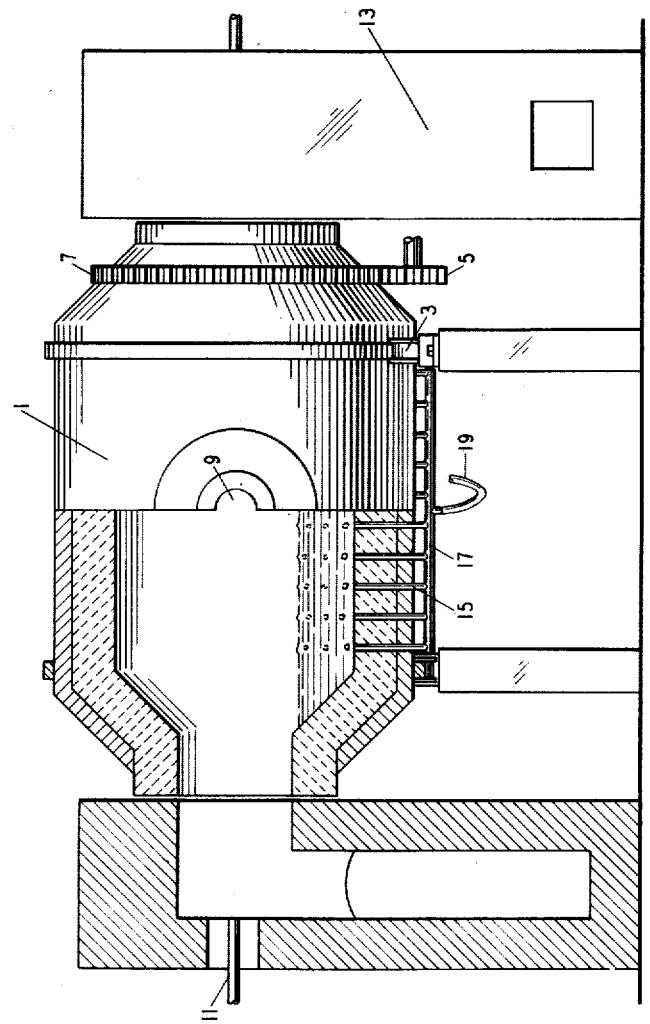
Raymond L. Copson
INVENTOR
BY Arthur L. Davis
ATTORNEY Patented Jan. 17, 1939

2,143,865

UNITED STATES PATENT OFFICE 2,143,865

TREATING PHOSPHATE ROCK TO ELIMINATE FLUORINE

Raymond L. Copson, near Sheffield, Ala.

Application November 30, 1936, Serial No. 113,451

4 Claims. (Cl. 23—108)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to the treatment of phosphate rock, particularly fluorapatite, or other haloapatite, to render it available as a plant food or to prepare it for further chemical treatment.

One of the objects of this invention is to provide a method for the removal of halogen from phosphate rock containing the same in chemical combination. Another object of this invention is to provide a method for the rapid, complete and certain removal of halogen from phosphate rock. Other objects of this invention include the conversion of fluorapatite into hydroxyapatite or tricalcium orthophosphate, as the case may be, in order that other phosphates may be subsequently prepared from the product obtained.

It has been proposed to treat phosphate rock with various metal halides, particularly the chlorides, over a wide range of temperatures in order tha the fluorine might be removed either in a volatile or extractable form. It has also been proposed to treat ground phosphate rock with water vapor to remove fluorine when heated to a high temperature within a very narrow range, possibly a range of 20 to 50° C., just below the sintering point of the rock, that is, without any appreciable fusion of the rock. When fusion occurs, the rock is said to become impervious to the water vapor, and the treatment becomes ineffective for the removal of fluorine.

I have discovered that halogens may be removed from phosphate rock containing the same in chemical combination by passing steam through the molten rock or otherwise agitating the molten rock in the presence of steam, until substantially all of the halogen is removed therefrom. The rock may be either melted in one furnace and steam treated in the same furnace, or it may be melted continuously or discontinuously in a fusion furnace and the melt charged to one or more furnaces or converters for steam treatment.

In the accompanying drawing which forms a part of the specification, the figure is a diagrammatic, vertical, part sectional view of one form of apparatus for the embodiment of my invention.

The cylindrical refractory lined furnace 1, is mounted on a plurality of trunnions, represented by trunnion 3, so that the furnace may be rotated about its horizontal axis by suitable means, such as by the use of a driving gear 5, acting upon gear 7. An opening 9, in the furnace shell is used for both charging the furnace and pouring the molten product from the tilted furnace. At each end of the furnace a burner 11, is provided to either fuse the charge or to maintain the temperature of the furnace such that a molten charge will remain fused. A recuperator 13, is provided at the end of the furnace opposite the burner 11, in order to provide preheated air for use in the adjacent burner as these burners are operated alternately to maintain the proper temperature within the furnace. The furnace 1, is provided with a plurality of steam inlets, represented by inlet 15, connected to a manifold 17, through which superheated steam is supplied by a flexible conduit 19, from a source not shown.

In the operation of the furnace, it is rotated so that the opening 9, is positioned at substantially the top of the furnace and the steam inlets 15, are positioned approximately 90° therefrom. The phosphate rock may either be charged to the furnace in the solid form and melted therein or the furnace may be preheated to at least the fusion point of the rock and a charge of molten rock phosphate admitted thereto. The burners, represented by burner 11, are shut off when the rock phosphate is at such a temperature as to maintain it at the fusion state throughout the subsequent operations. A sufficient amount of superheated steam is admitted through the inlets 15, to keep these inlets open even though submerged beneath the surface of the molten rock phosphate. The furnace 1, is then rotated for a distance sufficient to cause the inlets 15, to be positioned in substantially the bottom of the furnace. The passing of the superheated steam through the molten rock phosphate in continued until substantially all the halogen contained therein has been removed, at which time the furnace 1, is further tilted and the molten product discharged from the furnace through opening 9.

One example for the operation of my process is given for the treatment of brown Tennessee phosphate rock, containing 3.5% by weight of fluorine and with a melting point of approximately 1450° C. A charge of 20 parts by weight of the rock was melted in a fusion furnace and steam was then passed through the molten charge in the furnace until substantially all the fluorine had been removed. The time for the steam treatment was 15 minutes and the amount of steam used was in the proportion of 0.5 part by weight of steam per part by weight of rock charged. The product obtained on discharging the treated melt from the furnace, cooling and disintegrating the same, contained 0.1% by weight of fluorine. For the effectiveness of this treatment, the values obtained are compared with those obtained using the same quality of rock which contained 3.5% by weight of fluorine and had a melting point of approximately 1450° C. The rock was ground to pass a 40 mesh screen and was charged continuously to a rotary kiln at the rate of 120 pounds per hour. The maximum temperature zone in the kiln was obtained at approximately 1420° C. which was the operating range for just sintering the rock, that is, without more than incipient fusion of the rock. The time for this treatment was 1.5 hours and the amount of water vapor used, including that derived from the fuel and the steam added, was in the proportion of 0.8 pound of steam per pound of rock charged. The product obtained on cooling and disintegrating the material discharged from the rotary kiln contained 1.4% by weight of fluorine. It will be observed that effective treatment of the rock by my process is obtained in a small portion of the time required for the older proposed method of treatment of the rock with water vapor and, furthermore, it is possible to lower the fluorine content substantially below that obtained by such treatment.

The results of a larger number of semi-works scale experimental runs, as summarized in the following table, show the comparative results which have been obtained:

| Phosphate rock treatment | Treating temperature | Treating time | Fluorine |
|---|---|---|---|
|  | °C. |  | Percent |
| None | | | 3.3-3.5 |
| Calcining-steaming | 1400-1430 | .05-3 hours | 0.4-1.8 |
| Fusion-steaming | 1550-1650 | 10-20 mins | 0.1-0.2 |

It is evident that there are numerous factors which will influence conditions for the most satisfactory operation of my invention, the actual limits of which cannot be established except by a detailed study of each set of raw materials and the intermediate and finished products involved.

The phosphate rock used for treatment by my process may be any mineral phosphate containing halogen in chemical combination, such as fluorapatite and chlorapatite. Such materials, of course, always carry other mineral matter which may be removed to a greater or less extent by concentration, usually by physical processes, to produce material richer in phosphates. Such materials obtained by preliminary concentration are, of course, preferable for use in my process.

The fusion of the phosphate rock may be carried out in a fusion furnace discontinuously or continuously and the melt delivered to one or a plurality of steam treating furnaces equipped with a plurality of steam inlets for the admission of superheated steam through the melt, which is charged, or the rock may be melted and the melt treated with steam in a single furnace or a plurality of furnaces. The steam treating furnace is preferably a rotatable, horizontal, cylindrical, refractory lined furnace with an inlet or a plurality of inlets for the admission of steam into the furnace so arranged that during the fusion of the charge or charging of the melt the inlets will be above the level of the charge. A small amount of steam may be passed through these inlets continuously to keep the inlets clear or the admission of steam may be started immediately prior to the steam treatment at which time the furnace is rotated so that the inlets permit the admission of steam substantially at the bottom of the melt so that the most intimate contact between the melt and the steam is effected. The steam is admitted for sufficient time to remove substantially all the halogen, after which the furnace is again rotated so that the steam inlets are above the level of the melt and the furnace discharged. It is preferable to preheat the steam treating furnace by any convenient means, such as by placing an oil burner in one end, so that the interior is at least above the melting point of the rock at the time of the admission of the charge.

The phosphate rock so treated must be maintained at a temperature above its melting point, which for most rocks lies within the range of 1420° to 1550°. The amount of steam required for treatment will vary depending upon the nature of the rock being treated, the amount of halogen present, and the effectiveness of contact between the steam and the rock. The absolute limits for the amount of steam required have not been established but I have found that in all instances where this method has been used that an amount of 0.2 to 0.5 pound of steam per pound of rock charged has been adequate for this purpose. The time required for the treatment may likewise vary over a reasonable range but, at the same time, I have found that a period of 10 to 20 minutes is adequate for all rock so far processed.

The treated melt, on its discharge from the steam treating furnace, may be converted into a granular condition by such means as atomizing and cooling or running into water. This material may be screened or further disintegrated and screened as required.

It will be seen, therefore, that this invention actually may be carried out by the modification of certain details without departing from its spirit or scope.

I claim:

1. Process of treating phosphate rock to eliminate fluorine and render it available as a plant food, which comprises, heating the interior of a rotatable horizontal cylindrical refractory lined furnace, equipped with a plurality of inlets for the admission of superheated steam into the interior of the furnace; fusing the phosphate rock in a fusion furnace; withdrawing the fused phosphate rock from the fusion furnace; admitting a charge of the fused phosphate rock to the horizontal cylindrical furnace so rotated that the inlets are above the level of the liquid charged into the furnace; admitting superheated steam through the inlets and rotating the furnace so that the inlets are then located substantially at the bottom of the furnace; and continuing the admission of steam through the inlets up through the fused rock until substantially all the fluorine has been removed from the rock.

2. Process of treating phosphate rock to eliminate fluorine, which comprises, heating the interior of a refractory lined furnace, equipped with a plurality of inlets for the passage of steam through a liquid charged into the furnace; fusing the phosphate rock in a fusion furnace; withdrawing the fused phosphate rock from the fusion furnace; admitting steam through the inlets at the bottom of the refractory lined furnace equipped with a plurality of steam inlets; admitting a charge of the fused phosphate rock into the refractory lined furnace; and continuing the admission of steam through the inlets up through the fused rock until substantially all the fluorine has been removed from the rock.

3. Process of treating phosphate rock to eliminate fluorine and render it available as a plant food, which comprises, rotating a horizontal cylindrical refractory lined furnace, equipped with a plurality of inlets for the admission of steam into the interior of the furnace, so that the inlets are above the level of liquid charged into the furnace; fusing the phosphate rock in the furnace; admitting the steam through the inlets and rotating the furnace so that the inlets are located so that the steam emitting therefrom passes through the melt in the furnace; and continuing the admission of steam through the inlets up through the fused rock until substantially all the fluorine has been removed from the rock.

4. Process of treating phosphate rock to eliminate the halogen contained in chemical combination, which comprises, fusing the phosphate rock in a refractory lined furnace to form a body of molten phosphate; and passing steam through the body of molten phosphate in the furnace for a period of time of the order of 10 to 20 minutes with the amount of the steam being in the order of 0.2 to 0.5 pound per pound of phosphate.

RAYMOND L. COPSON.

CERTIFICATE OF CORRECTION.

Patent No. 2,143,865. January 17, 1939.

RAYMOND L. COPSON.

It is hereby certified that error appears in the printed specification of the above numbered patent requiring correction as follows: Page 2, first column, line 29, for the word "larger" read large; and second column, line 19, for "1550°" read 1550° C; page 3, first column, line 9, claim 3, before "liquid" insert a; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.

the fused rock until substantially all the fluorine has been removed from the rock.

3. Process of treating phosphate rock to eliminate fluorine and render it available as a plant food, which comprises, rotating a horizontal cylindrical refractory lined furnace, equipped with a plurality of inlets for the admission of steam into the interior of the furnace, so that the inlets are above the level of liquid charged into the furnace; fusing the phosphate rock in the furnace; admitting the steam through the inlets and rotating the furnace so that the inlets are located so that the steam emitting therefrom passes through the melt in the furnace; and continuing the admission of steam through the inlets up through the fused rock until substantially all the fluorine has been removed from the rock.

4. Process of treating phosphate rock to eliminate the halogen contained in chemical combination, which comprises, fusing the phosphate rock in a refractory lined furnace to form a body of molten phosphate; and passing steam through the body of molten phosphate in the furnace for a period of time of the order of 10 to 20 minutes with the amount of the steam being in the order of 0.2 to 0.5 pound per pound of phosphate.

RAYMOND L. COPSON.

CERTIFICATE OF CORRECTION.

Patent No. 2,143,865. January 17, 1939.

RAYMOND L. COPSON.

It is hereby certified that error appears in the printed specification of the above numbered patent requiring correction as follows: Page 2, first column, line 29, for the word "larger" read large; and second column, line 19, for "1550°" read 1550° C; page 3, first column, line 9, claim 3, before "liquid" insert a; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.